US008270958B2

(12) United States Patent
Olshansky et al.

(10) Patent No.: US 8,270,958 B2
(45) Date of Patent: Sep. 18, 2012

(54) APPARATUS, SYSTEM AND METHOD FOR AUTOMATED COMMUNICATION FORWARDING

(75) Inventors: Robert Olshansky, Wayland, MA (US); Lee N. Goodman, Tyngsboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1099 days.

(21) Appl. No.: 11/765,841

(22) Filed: Jun. 20, 2007

(65) Prior Publication Data

US 2008/0318561 A1 Dec. 25, 2008

(51) Int. Cl.
H04W 4/14 (2009.01)
H04B 5/02 (2006.01)

(52) U.S. Cl. .................................. 455/417; 455/414.1
(58) Field of Classification Search .................. 455/417, 455/445, 456.1, 456.6
See application file for complete search history.

(56) References Cited

U.S. PATENT DOCUMENTS

| | | | |
|---|---|---|---|
| 7,031,698 B1* | 4/2006 | Appelman | 455/417 |
| 7,116,975 B1 | 10/2006 | Link, II et al. | |
| 7,162,237 B1* | 1/2007 | Silver et al. | 455/417 |
| 7,693,512 B1* | 4/2010 | West | 455/417 |
| 2002/0164979 A1* | 11/2002 | Mooney et al. | 455/417 |
| 2002/0187777 A1* | 12/2002 | Osterhout et al. | 455/417 |
| 2004/0091095 A1* | 5/2004 | Weaver | 379/211.02 |
| 2005/0113108 A1* | 5/2005 | Kadakia et al. | 455/456.1 |
| 2006/0209740 A1* | 9/2006 | Anza Hormigo et al. | 370/328 |
| 2006/0258287 A1* | 11/2006 | Bidet et al. | 455/41.2 |
| 2007/0032225 A1* | 2/2007 | Konicek et al. | 455/417 |
| 2007/0064918 A1* | 3/2007 | Son | 379/355.01 |
| 2007/0082668 A1* | 4/2007 | Silver et al. | 455/456.1 |

* cited by examiner

Primary Examiner — Jean Gelin
Assistant Examiner — Tangela T. Chambers

(57) ABSTRACT

An apparatus is provided for forwarding communications automatically. The apparatus includes a processing element that receives data from a local connection point or a network element regarding the presence of a device at or near the local connection point or other location. The device is associated with a first communications terminal and transmits a signal that can be detected by the local connection point or the network element. Upon receiving the data, including an indication of the presence of the device, the apparatus may automatically forward communications from one or more communications terminals to a particular communications terminal, as specified by forwarding instructions. The forwarding instructions may be provided by a user ahead of time or included in the data received by the apparatus, and the instructions may be stored in a storage element of the apparatus. Systems, methods, and computer program products for forwarding communications automatically are also provided.

21 Claims, 7 Drawing Sheets

APPARATUS, SYSTEM AND METHOD FOR AUTOMATED COMMUNICATION FORWARDING

BACKGROUND

It is generally considered a rare occurrence these days to find a person who does not own or have access to a communications terminal, such as a telephone, portable digital assistant (PDA), or computer. In fact, many people use multiple communications terminals to communicate and to conduct their daily business. Considering telephones as an example, a person may use a personal mobile phone as well as a wireline home phone, a wireline office phone, and perhaps even a mobile office phone. Although these phones may be located in different places, a person can generally only be in one place at a time. As a result, important calls designated for a particular telephone may be relegated to a thirty-second message on an answering machine, or missed all together, if the person is not there to take the call.

To address this issue, some people forward calls from one communications terminal to another. For example, when an employee is not in his office to receive a call on his work phone, his assistant may be able to manually forward the call to the employee's mobile or home phone number. Similarly, the person may manually accomplish such call forwarding himself by dialing a star code (such as *72) to activate call forwarding and may enter the ten-digit telephone number to specify the phone to which he would like the calls forwarded. If call forwarding is no longer needed, the person may deactivate the service by dialing another star code (such as *73).

However, such approaches to call forwarding require an action by the user or the user's delegate to activate and deactivate the call forwarding feature. The user must therefore spend time activating the feature, such as by dialing the star code or informing his assistant to forward his calls. Furthermore, the user may forget to take the steps necessary to activate or deactivate call forwarding. As a result, he may miss important calls that are not forwarded to his location, or he may miss calls because he neglected to deactivate call forwarding. In addition, forwarding calls from more than one phone may not even be possible.

Thus, there is a need for improved techniques to forward communications from one or more communications terminals to another communications terminal that reduce the obligations imposed upon the user to institute and to cancel the forwarding operations.

BRIEF DESCRIPTION OF THE SEVERAL VIEWS OF THE DRAWING(S)

DETAILED DESCRIPTION

Exemplary embodiments now will be described hereinafter with reference to the accompanying drawings, in which exemplary embodiments and examples are shown. Like numbers refer to like elements throughout.

Apparatuses, systems, and methods for forwarding communications automatically based on presence are provided in accordance with various exemplary embodiments. In general, apparatuses, systems, and methods are described for detecting the presence of a presence notification device associated with a first communications terminal and automatically forwarding communications based on the presence or absence of the device. A forwarding server is configured to receive an indication of the presence of the device at a predetermined location (such as a user's home) based on a signal transmitted by the device and to direct the forwarding of each communication in response to the indication. In this way, for example, a user of multiple communications terminals, such as a mobile telephone and a wireline home telephone, may arrange for communications designated for the mobile telephone to be automatically forwarded to the home telephone when the user is at home. Furthermore, the user may arrange for communications designated for the home telephone to be automatically forwarded to the mobile telephone when the user is not at home.

Figure 1:
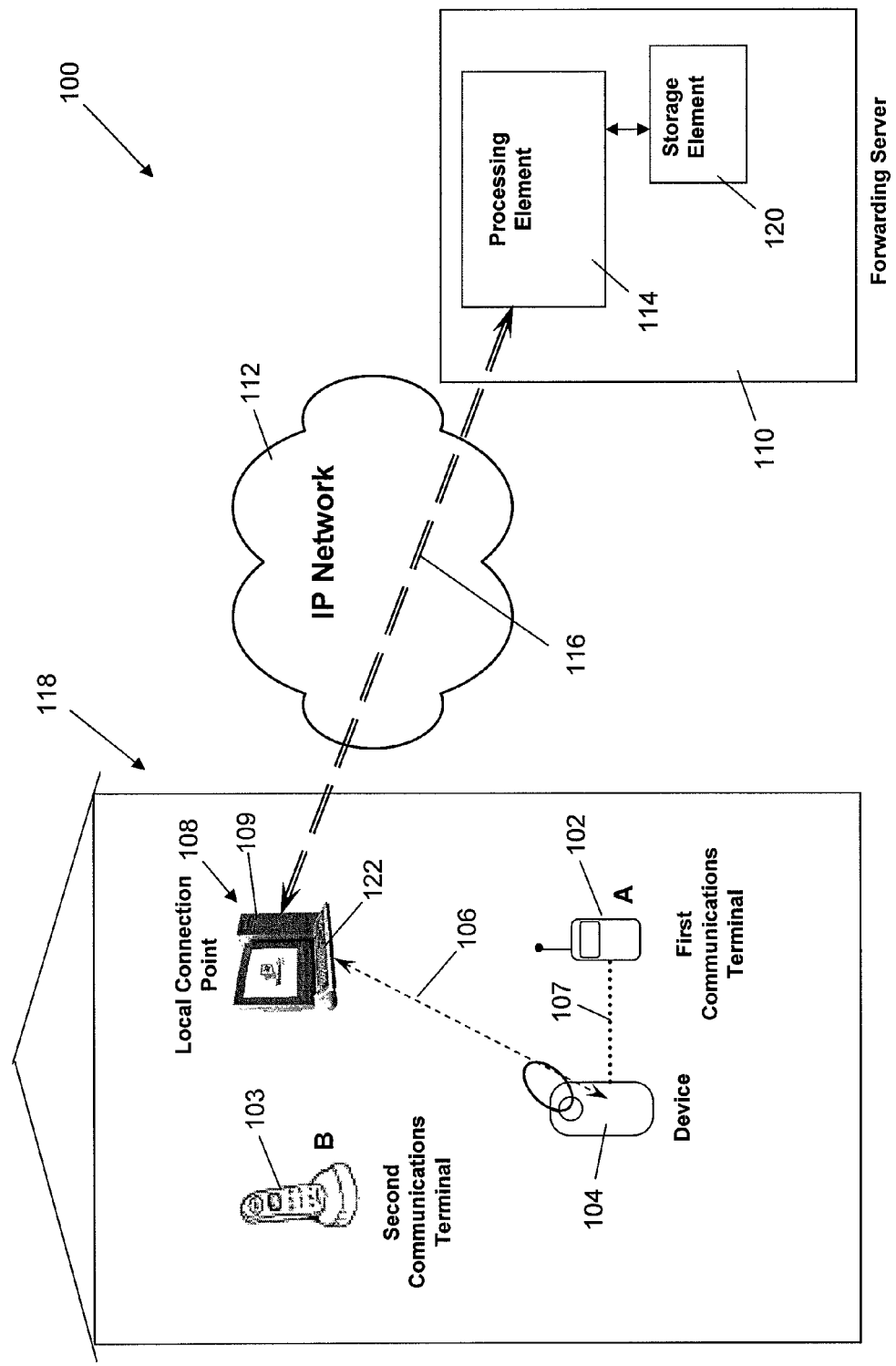
FIG. 1 is a schematic illustration of a system according to one embodiment.
Figure 6:
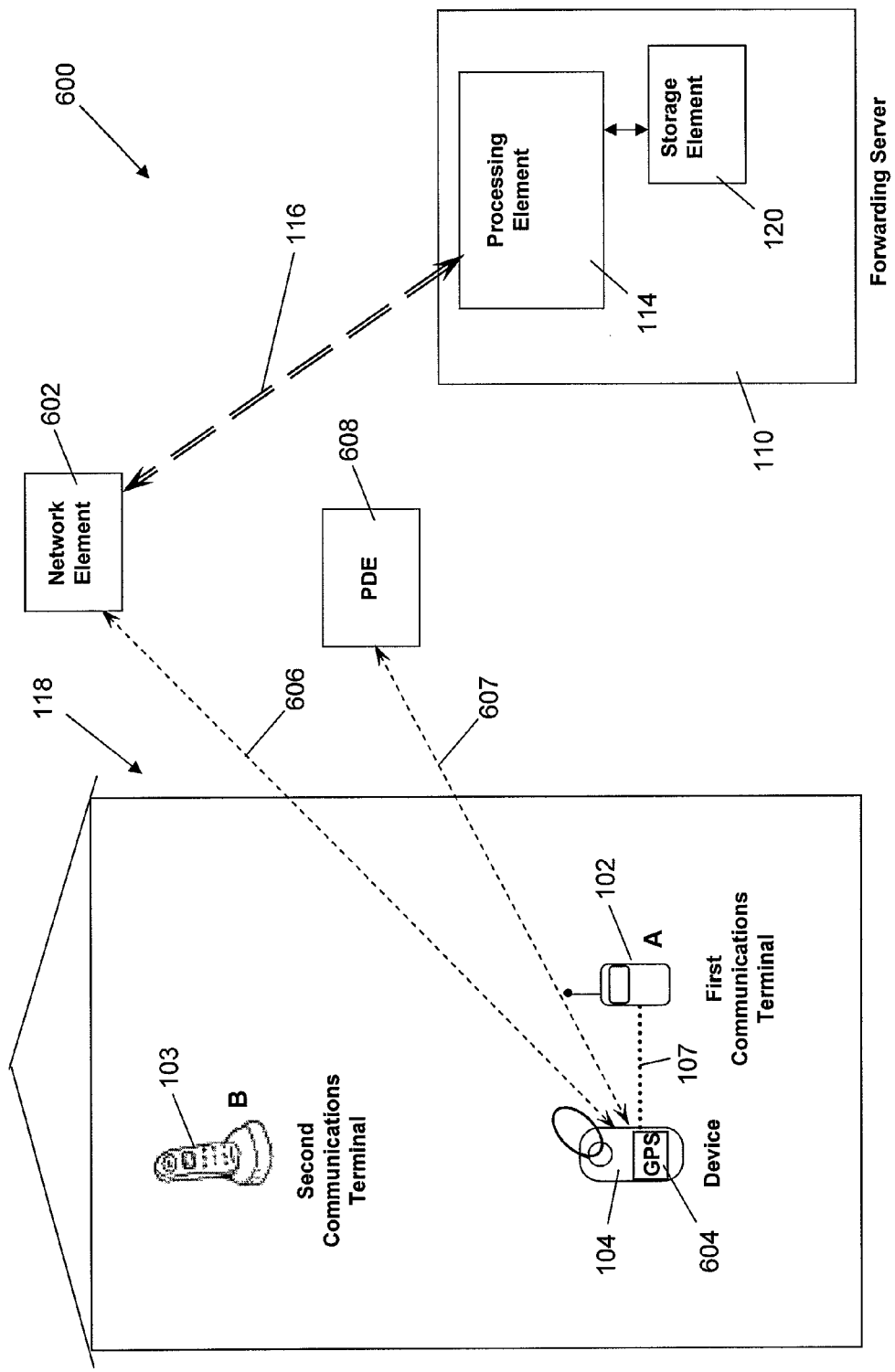
FIG. 6 is a schematic illustration of a system according to another embodiment including a network element.

FIG. 1 illustrates a system 100 according to one embodiment for automatically forwarding communications between and among multiple communications terminals 102, 103. The system 100 includes a presence notification device 104 configured to transmit a presence signal 106, a first communications terminal 102 associated with the presence notification device 104, a second communications terminal 103, a local connection point 108 configured to receive the presence signal 106, and a forwarding server 110 configured to communicate with at least the local connection point 108. FIG. 6 illustrates a system 600 according to another embodiment that includes a presence notification device 104 configured to transmit a signal, a first communications terminal 102 associated with the presence notification device 104, a second communications terminal 103, a network element 602 configured to receive the signal and to determine an indication based on the signal, and a forwarding server 110. As shown in FIG. 6, for example, the device 104 may be configured to transmit location information 606 as part of or in addition to the signal transmitted to the network element 602. The forwarding server 110 is configured to receive an indication of the presence of the presence notification device 104 from the local connection point 108 or from the network element 602 and is configured to direct the forwarding of each communication designated for one of the first and second communications terminals 102, 103 in response to the indication.

Referring to FIGS. 1 and 6, the first and second communications terminals 102, 103 include any terminal configured to transmit and receive communication signals, whether fixed or mobile. Communications terminals may include, for example, wireline telephones, Voice over Internet Protocol (VoIP) telephones, personal computers, servers, mobile telephones, portable digital assistants (PDAs), pagers, laptop computers, and other types of voice, text, and video communications systems. For example, in FIG. 1, a mobile telephone is illustrated at A, and a wireline cordless telephone is illustrated at B. It should be understood, however, that the telephones as illustrated and hereinafter described are merely illustrative of one type of communications terminal and, therefore, should not be taken to be limiting. Similarly, a communication may include any communications signal transmitted between communications terminals, including text, audio, and video signals, such as telephone calls, video conferencing, and instant messaging, among others. Thus, although embodiments are described herein using phone calls that are forwarded between and among telephones, it is understood that this language is not meant to be limiting and is only used to facilitate the explanation of embodiments.

As previously mentioned, the presence notification device 104 may be associated with the first communications terminal 102, as depicted in the figures by the dotted line 107. The presence notification device 104 may include any type of transmitter or transceiver that is configured to emit signals (such as short range radio signals, e.g., Bluetooth or WiFi) that may be used to determine whether the presence notification device 104 is present in the proximity of the local connection point 108. For example, the presence notification device 104 may include a Bluetooth transceiver or an RFID transceiver and may operate either actively or passively. The presence notification device 104 may be any size or shape capable of supporting the source of the presence signal 106 (e.g., the transceiver). However, in one embodiment, the presence notification device 104 may be small and lightweight such that a user may carry or keep the presence notification device on his person. For example, the presence notification device 104 may be configured (i.e., sized and shaped) to fit on a keychain, as shown in FIG. 1, or to be carried in a wallet or purse. In some embodiments, the presence notification device 104 may be included within the first communications terminal 102 or otherwise co-located with the first communications terminal. For example, a mobile phone or PDA may be equipped with a Bluetooth transceiver such that the presence notification device 104 and the first communications terminal 102 are included in a single unit. In any case, the presence of the presence notification device 104 in the proximity of a local connection point 108 or any other predetermined location may correspond to the physical presence of the person himself, and thus incoming calls may be automatically forwarded to the appropriate communications terminal based on the situation and according to the user's preferences, as discussed in more detail below.

Referring to FIG. 1, in some embodiments the system 100 includes a local connection point 108. The local connection point 108 may be, for example, a wireless access point or any other device that interacts with a wide area network (wireless or wireline broadband network) to provide communication services. The local connection point 108 may include a wireless receiver capable of receiving the presence signals 106 from the presence notification device 104 and may include or communicate with any equipment or device capable of communicating with a forwarding server 110 via a network of the service provider responsible for routing calls to the user. In this regard, the local connection point 108 may include a Bluetooth receiver, an RFID receiver, or any other receiver configured to receive the presence signal 106. In some embodiments, the local connection point 108 may include a personal computer 109 having a connection to a wide area data network and a built in receiver, such as a computer with Bluetooth capabilities. In instances in which the presence notification device is passive, the local connection point 108 may include a signal source for transmitting interrogative signals that power the presence notification device and elicit a response.

Alternatively, a receiver may be connected to a computer to form the local connection point 108, such as peripheral equipment connected via a port of the computer. For example, a Universal Serial Bus (USB) flash drive, a Bluetooth dongle, or other hardware lock device used for software protection, may serve as the wireless receiver and be connected to a port of the computer 109. By utilizing an external receiver, the local connection point 108 may be movable from one geographic location to another. Thus, a user may configure a local connection point 108 at a number of locations using the same receiver. For example, the user may insert a Bluetooth dongle in a port of a computer at his home to form a local connection point 108 at home. Upon leaving home to go to his office, the user may remove the Bluetooth dongle from his home computer and install it on his work computer. In this way, a user may set up a local connection point 108 in more than one location using one dongle, and calls may be forwarded to the appropriate communications terminal based on the current location of the local connection point 108. In some embodiments, a local connection point 108 may be built into a laptop computer that the user may carry with him to various locations.

The local connection point 108 need not include a computer, but in some embodiments may, for example, include a wireline telephone having a connection to a wide area data network. However, the local connection point 108 may still be configured to receive the presence signal 106 wirelessly from the presence notification device 104. Thus, the wireless aspect of the local connection point 108 may be between the local connection point 108 and the presence notification device 104, whereas the wireline aspect of the local connection point 108 may be between the local connection point 108 and the forwarding server 110.

The local connection point 108 may be configured to communicate with the forwarding server 110 over a wide area data network other than the network with which the first communication terminal 102 is configured to directly communicate. For example, the local connection point 108 may be configured to communicate the indication of the presence of the presence notification device 104 using a public packet-switched network, such as the Internet, a private IP network 112 (shown in FIG. 1), or a combination of such networks, whereas the first communications terminal 102 may be configured to directly communicate with a cellular network. For instance, the local connection point 108 may have a wireless connection to the Internet to communicate with the forwarding server 110, for example using WiFi or an Evolution-Data Optimized (EVDO) card. In this way, the local connection point 108 may be able to communicate with the forwarding server 110 regardless of the availability of the network used by the first communications terminal 102, e.g., a cellular signal. Thus, even if there is no cellular signal at the location of the local connection point 108, automated call forwarding may still be activated/deactivated, as described below.

The local connection point 108 is configured to receive the presence signal 106 when the distance between the presence notification device 104 and the local connection point 108 is equal to or less than a predefined distance, such as 30 feet. As such, receipt of the presence signal is indicative of a presence of the presence notification device 104 at the local connection point 108. Furthermore, as previously mentioned, the first communications terminal 102 is associated with the presence notification device 104, such that the presence of the presence notification device 104 at a local connection point 108 may correspond to the presence of the first communications terminal 102 at the local connection point 108. In FIG. 1, for example, the presence notification device 104 is associated with the mobile telephone A (as represented by the dotted line 107). Thus the presence of the presence notification device 104 at the local connection point 108 may imply the presence of the mobile telephone A, such as when the user has the presence notification device 104 on his keychain and is carrying his mobile phone A in his pocket.

In other embodiments, the presence of the presence notification device 104 at a particular location, such as at the user's home 118, may be determined by an element of a network using locating techniques that may determine the physical location (e.g., latitude and longitude position) of the device 104. For example, referring to FIG. 6, a system 600 may include a network element 602 in communication with the forwarding server 110 and the presence notification device 104, rather than the local connection point 108 of FIG. 1. The network element 602 may be, for example, a location-based server or any other element of a communications or data network that is configured to receive information 606 from the presence notification device 104 either directly or through other network elements (such as through cellular base stations, local connection points, satellites, or other elements not shown in FIG. 6).

System 600 may include a second network element, such as a position determination entity (PDE) 608 as shown in FIG. 6, that is configured to communicate with the presence notification device 104 via communication signals 607. The PDE 608 may be configured to calculate the physical position (i.e., latitude and longitude) of the device 104 based on the communication signals 607 received and to return the estimated position to the device 104. Alternatively, the presence notification device 104 may calculate its physical location without the need to communicate with the PDE 608. Either way, the device 104 may then communicate the calculated position to the network element 602 via the location information 606, and the network element 602 may then determine whether the device 104 is present at the user's home, office, or any other physical location defined by the user or the network.

For example, as shown in FIG. 6, in some embodiments the presence notification device 104 may include a Global Positioning System (GPS) chip 604 configured to communicate with three or more earth-orbiting satellites to identify the position (e.g., latitude and longitude) of the presence notification device 104 on the surface of the earth. Location information 606 derived from the location signals obtained by the GPS chip 604 in this example may then be transmitted from the device 104 to the network element 602, as previously described. In some cases, as mentioned above, the device 104 may be included in the first communications terminal 102, such as when the first communications terminal 102 is a mobile phone that includes a GPS chip.

Alternatively, the position of the presence notification device 104 may be calculated by the device 104 based on the strength of terrestrial signals received by the device 104 using a locating technique such as radiolocation and trilateration. A terrestrial signal may include, for example, any signal generated by towers or other communication stations on the ground, such as cellular signals, WiFi, or WiMAX. For example, if the presence notification device 104 is included in the first communications terminal 102 and the first communications terminal 102 is a mobile phone communicating over a cellular network, the strength of the cellular signal received by the mobile phone from the nearest cellular towers (e.g., the three closest towers) may be measured. Based on the signal strength, radiolocation and trilateration or other techniques may be used by the device 104 to determine the position of the device 104 (in this case, the phone). Thus, location information derived from the strength of the cellular signals in this example may be transmitted to the network element 602 (via the device 104 or other elements of the network).

Based on the position of the presence notification device 104 included in the location information, the presence of the device 104 proximate the predetermined location (e.g., the user's home) may be ascertained. For instance, the location of the user's home may be defined (for example based on the user's address) as a certain latitude and longitude position. The position of the device 104 as received or determined by the network element 602 may be compared to the position of the user's home to determine whether the presence notification device 104 is present at the home location. For example, a position of the device 104 that is within a certain radius of the home location (such as within 100 feet) may imply that the device 104 is "present," whereas a position that is outside the given radius (e.g., farther than 100 feet from the location) may imply that the device 104 is "not present." The network element 602 may then transmit data 116 including the indication of presence (e.g., "present" or "not present") to the forwarding server 110 for directing the forwarding of calls, as described below.

In any case, referring to FIGS. 1 and 6, the forwarding server 110 may be configured to direct the forwarding of calls automatically based on the indication of presence from the local connection point 108 or the network element 602 according to one or more forwarding instructions. The forwarding server 110 may include a processing element 114 configured to receive data 116 from the local connection point 108 or the network element 602, access one or more forwarding instructions based on the data 116, and direct the forwarding of each call according to the forwarding instruction(s) and the indication. The data 116 received by the forwarding server 110 includes an indication of the presence of the presence notification device 104 at the predetermined location (e.g., at the local connection point 108 or at the defined latitude and longitude position). As previously discussed, the presence notification device 104 is associated with the first communications terminal 102, and the indication is based on the presence signal 106 or location information 606 transmitted by the presence notification device 104.

The forwarding server 110 may direct the forwarding of calls by directly routing calls to the appropriate second communications terminal or by providing instructions to one or more elements of a communications network which are configured to route the calls accordingly. Thus, directing the forwarding of calls as used herein may include routing the call to the second communications terminal or providing instructions to one or more network elements to accomplish the forwarding operation.

Figure 2:
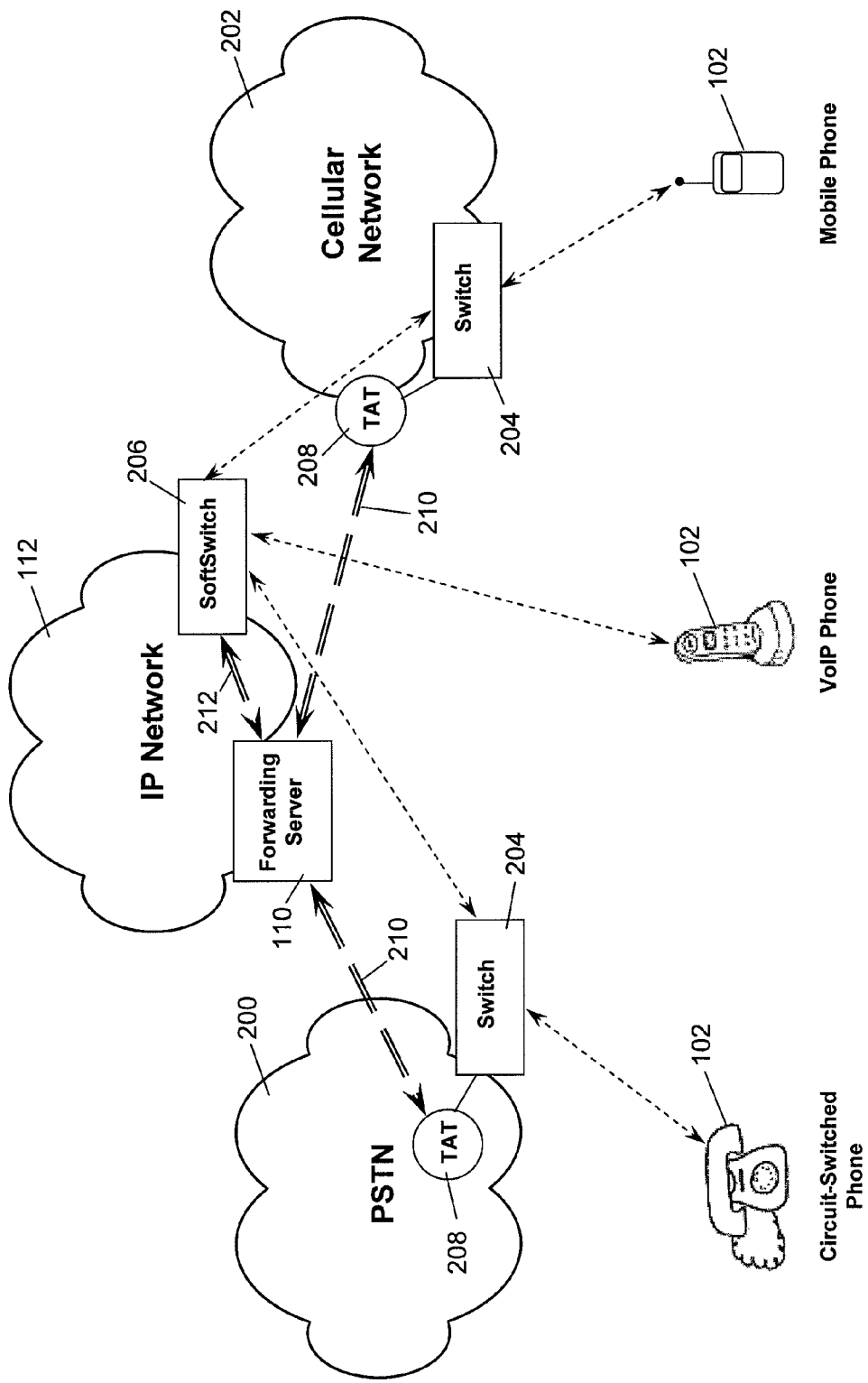
FIG. 2 is a schematic illustration of multiple communications networks according to one embodiment.

The forwarding server 110 may be configured to interact with various communications networks to forward calls from one communications terminal to another as different communications terminals may be served by different communications networks. For example, FIG. 2 shows a public circuit-switched telephone served by a Public Switched Telephone Network (PSTN) 200, a VoIP telephone served by an IP network 112, and a mobile phone served by a cellular wireless network 202. Although in FIG. 2 the forwarding server 110 is shown as residing on the same IP network 112 that serves the VoIP telephone, the VoIP telephone may served by a different IP network, and other PSTN and mobile phones may similarly be served by other PSTN and cellular networks not shown. In general, when a call is made to the circuit-switched or mobile phones, the call may be routed to the respective phone by a switch 204 residing on the respective network. Similarly, a softswitch 206 residing on the IP network 112 may route calls designated for the VoIP phone. Various other network elements, such as gateways, routers, bandwidth managers, call agents, and others, not shown, may also be involved in serving the phones.

When a first communications terminal 102 registers for call forwarding, the forwarding server 110 may interact with one or more networks to execute the forwarding operation in different ways, depending on the type of first communications terminal 102 and the network by which it is served. For example, in the case of a PSTN 200 or cellular network 202 that are configured to provide advanced intelligent network (AIN) services, a terminating attempt trigger (TAT) 208 may be set on the switch 204 that serves the first communications terminal 102. When a call designated for the first communications terminal 102 (circuit-switched or mobile) is received by the respective switch 204, the TAT 208 may cause an event notification 210 to be transmitted to the forwarding server 110. The forwarding server 110 may respond to the event notification 210 by providing forwarding instructions, such as whether the call should be forwarded and to which second communications terminal (not shown) to route the call, discussed below.

If the first communications terminal 102 is a VoIP phone served by a softswitch 206, a Session Initiation Protocol (SIP) invite may be received by the softswitch 206 when a call designating the VoIP phone is made. The softswitch 206 may then send a query 212 to the forwarding server 110 requesting forwarding instructions. The forwarding server 110 may respond by providing forwarding instructions to the softswitch 206 regarding the routing of the incoming call. Alternatively, the forwarding server 110 may send a message to a VoIP application server (not shown) to forward incoming calls to the appropriate second communications terminal. Calls may also be forwarded in other ways, not mentioned here, depending on the network architecture and the communications terminals involved.

Referring again to FIGS. 1 and 6, in some embodiments, the forwarding server 110 may be configured to forward each call designated for the first communications terminal A to the second communications terminal B. For example, a person may have a mobile phone (A), which he carries with him when he is not at home 118, as well as a wireline telephone (B) located at the home 118. When the person is at home, he may wish to receive all phone calls on his wireline phone B for several reasons. For example, the individual may wish to conserve his mobile telephone minutes when he has access to his wireline phone, he may get better reception using his wireline equipment, or he may not be able to use his mobile phone at home due to a very weak cellular signal. Regardless of the reasons, the person may want all calls designated for his mobile phone A to be forwarded to his wireline phone B when he is at home.

The person may carry on his keychain a presence notification device 104 as described above. In some embodiments such as the embodiment of FIG. 1, the presence notification device 104 may be configured to transmit a presence signal 106 that can be received by the local connection point 108 when the distance between the presence notification device 104 and the local connection point 108 is equal to or less than a predefined distance. For example, the presence notification device 104 may have a range of 30 feet, and thus the local connection point 108 may receive the presence signal 106 transmitted by the presence notification device 104 when the presence notification device 104 is within 30 feet of the local connection point 108. Thus, in this example, the local connection point 108 may detect the presence of the presence notification device 104 (i.e., receive the presence signal 106) when the person enters his house.

Upon detecting the presence signal 106, the local connection point 108 may transmit data 116 to the processing element 114 of the forwarding server 110, including an indication of the presence of the presence notification device 104 at the local connection point 108. In this example, the indication would reflect the fact that the presence notification device 104 is indeed present. The data 116 may include information identifying the local connection point 108, the presence notification device 104, and/or the associated first communications terminal 102 (e.g., using a 48-bit MAC address), authentication information (e.g., a passkey), as well as other information for facilitating the communication between the local connection point 108 and the forwarding server 110.

In other embodiments, such as the embodiment illustrated in FIG. 6, the presence notification device 104 may be configured to transmit location information 606 to a network element 602. The location information 606 may include GPS signals or terrestrial signals that allow the network element 602 (or multiple network elements) to determine the location of the device 104 relative to a predefined location (such as the home 118). Alternatively, the location information 606 may include a physical location as determined by the device 104 itself based on GPS signals or terrestrial signals, or as determined by communications 607 with a PDE 608, as previously described. As a result, the network element 602 may then transmit data 116 to the processing element 114 of the forwarding server 110, including an indication of the presence of the device 104.

In any case, based on such data 116, the processing element 114 of the forwarding server 110 may access one or more forwarding instructions specifying, for example, which calls to forward and to which communications terminal the calls should be forwarded. Thus, for example, the forwarding instructions may specify that when the indication indicates that the presence notification device 104 is present, each call designated for the first communications terminal 102 is to be forwarded to a second communications terminal 103. Furthermore, the instructions may include information identifying the second communications terminal 103, such as a telephone number or MAC address. As a result, calls designated for the mobile phone A may be automatically forwarded to the wireline phone B when the presence notification device 104 is within range of the local connection point 108 in FIG. 1, or when the position of the presence notification device 104 is within a certain radius of the user's home in FIG. 6 (implying that the person is at home in both examples).

Referring again to the embodiment illustrated in FIG. 1, the absence of the presence signal 106 at the local connection point 108 may also provide an indication of the presence of the presence notification device 104 (and, by inference, the presence of the associated first communications terminal 102). The absence of the presence signal 106 may correspond to the absence of the presence notification device 104 at the location of the local connection point 108, which may mean, for example, that the person has gone out and is no longer at home 118. In this case, continued forwarding of calls to the wireline phone B may cause the person to miss important calls. To avoid such a result, the indication of the presence of the presence notification device 104 may include the absence of the presence notification device 104 (based on the absence or non-receipt of the presence signal 106 by the local connection point 108). For example, if the local connection point 108, having previously received the presence signal 106 and activated call forwarding (to forward calls from the mobile phone A to the wireline phone B), no longer receives the presence signal 106, the forwarding server 110 may be configured to deactivate (or discontinue) call forwarding in response to the indication received from the local connection point 108 of the failure to receive any further presence signals 106 in accordance with the forwarding instructions.

Similarly, referring to FIG. 6, a determination that the presence notification device 104 is not within a certain radius of the predetermined location (e.g., the user's home 118) may mean that the person is not at home. The fact that the device 104 is "not present" may then be included in the indication received from the network element 602, and the forwarding server 110 may be configured to deactivate or discontinue call forwarding in response to the indication and in accordance with the forwarding instructions.

In some cases, the processing element 114 of the forwarding server 110 may be configured to forward each call designated for the second communications terminal 103 to the first communications terminal 102 if the indication indicates that the presence notification device 104 is not present. For example, the person may wish to receive phone calls on his mobile phone A when he is away from home 118 (as the mobile phone A is the one he carries with him). Thus, in FIG. 1, non-receipt of the presence signal 106 by the local connection point 108 may be included in the indication communicated to the forwarding server 110. Likewise, a "not present" state derived from location information 606 in FIG. 6 transmitted by the device 104 that is not in the vicinity of the home 118 may be included in the indication communicated to the forwarding server by the network element 602. As a result, the processing element 114 in both cases may forward calls designated for the second communications terminal (wireline phone B) to the first communications terminal (mobile phone A).

As illustrated in FIGS. 1 and 6, the forwarding server 110 may further include a storage element 120 configured to store the one or more forwarding instructions. The storage element 120 may include, for example, a database with entries describing various parameters regarding the forwarding of calls, such as which calls to forward, when to activate call forwarding, where to forward calls, etc. Each entry or group of entries may be associated with a particular user (such as through an account number), with a particular local connection point 108, presence notification device 104, or first communications terminal 102, or in any other way such that the appropriate forwarding instructions may be accessed based on the data 116 received from the local connection point 108 or the network element 602.

Figure 3:
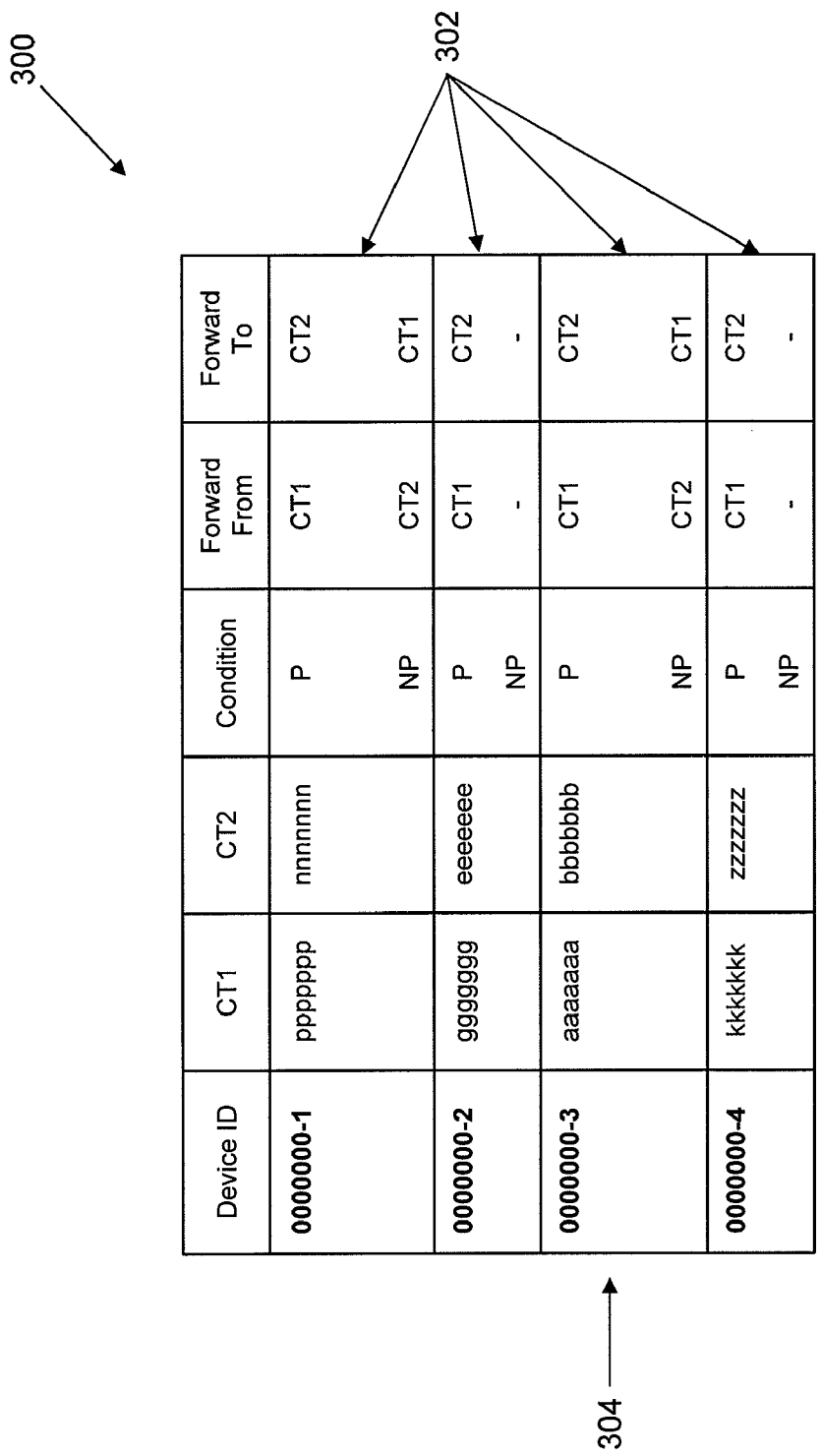
FIG. 3 is a schematic illustration of a database including forwarding instructions according to one embodiment.

Referring to FIG. 3, for example, the storage element 120 of the forwarding server 110 may include a database 300 with entries 302 specifying a Device ID, the first communications terminal (CT1), the second communications terminal (CT2), Condition, Forward From (i.e., the communications terminal(s) from which to forward calls), and Forward To (i.e., the communications terminal(s) to which to forward calls). In this example, the data 116 received by the processing element 114 may include a Device ID 0000000-3, corresponding to the presence notification device 104 from which the presence signal 106 or location information 606 was received by the local connection point 108 or the network element 602, respectively, in addition to the indication of presence and any other information. The processing element 114 in this case may refer to the entry 304 associated with Device ID 0000000-3 to access the appropriate forwarding instructions. Thus, if the data 116 included an indication that the presence notification device 104 was Present (P), the processing element 114 would forward calls designated for the first communications terminal to the second communications terminal. The resulting forwarding instruction in this example may be to "Forward from CT1 and Forward to CT2." Alternatively, in this example, if the data 116 included an indication that the presence notification device 104 was Not Present (NP), the processing element 114 would forward calls designated for the second communications terminal to the first communications terminal (Forward From CT2; Forward To CT1).

Referring again to FIGS. 1 and 6, the processing element 114 may be configured to determine at least one of the forwarding instructions based on inputs received from a user, such as the person in the previous examples who has a mobile phone A and a wireline phone B at home, via a user interface. The user may, for example, be running software on the computer 109 included in his local connection point 108 (or any other computer, not shown, in the case of FIG. 6) that provides him with a Graphical User Interface (GUI) to allow him to interact with the processing element 114. For example, the GUI may enable him to specify the second communications terminal 103 to which he may want calls forwarded. Alternatively, the user may be able to access a secure web page (e.g., through an Internet connection) that is configured to receive certain user inputs.

Thus, using a keyboard 122 shown in FIG. 1 or any other user input device (such as a mouse, touch screen, or keypad), the user may be able to provide certain aspects of the forwarding instructions to the processing element 114. For example, the user may enter a telephone number, a Session Initiation Protocol (SIP) Uniform Resource Identifier (URI), or any other communications terminal identifier to be incorporated into the forwarding instructions. In this way, if the person in our previous examples has two wireline telephones at home as well as the mobile phone A, he may be able to designate to which of the two wireline phones he wants calls forwarded when he is at home. Similarly, the user may provide other forwarding instructions, such as additional conditions for call forwarding (e.g., times of the day during which calls should or should not be forwarded) and changes to account information. The user may be able to provide the inputs at any time prior to the forwarding of calls, such as when the user initially registers for or installs the service. Likewise, the user may subsequently be able to modify or add to the forwarding instructions by providing additional inputs.

Furthermore, in embodiments including a local connection point 108 as shown in FIG. 1, the processing element 114 may be configured to receive inputs regarding the forwarding instructions from the local connection point 108. For example, the local connection point 108 may be associated with the second communications terminal 103, and identifying information for the second communications terminal 103 may be included in the data 116 received by the processing element 114 from the local connection point 108. In this way, the presence of the presence notification device 104 at a particular local connection point 108 may automatically trigger the forwarding of calls from the first communications terminal 102 (which is associated with the presence notification device 104) to the second communications terminal 103 (which is associated with the local connection point 108).

Figure 4:
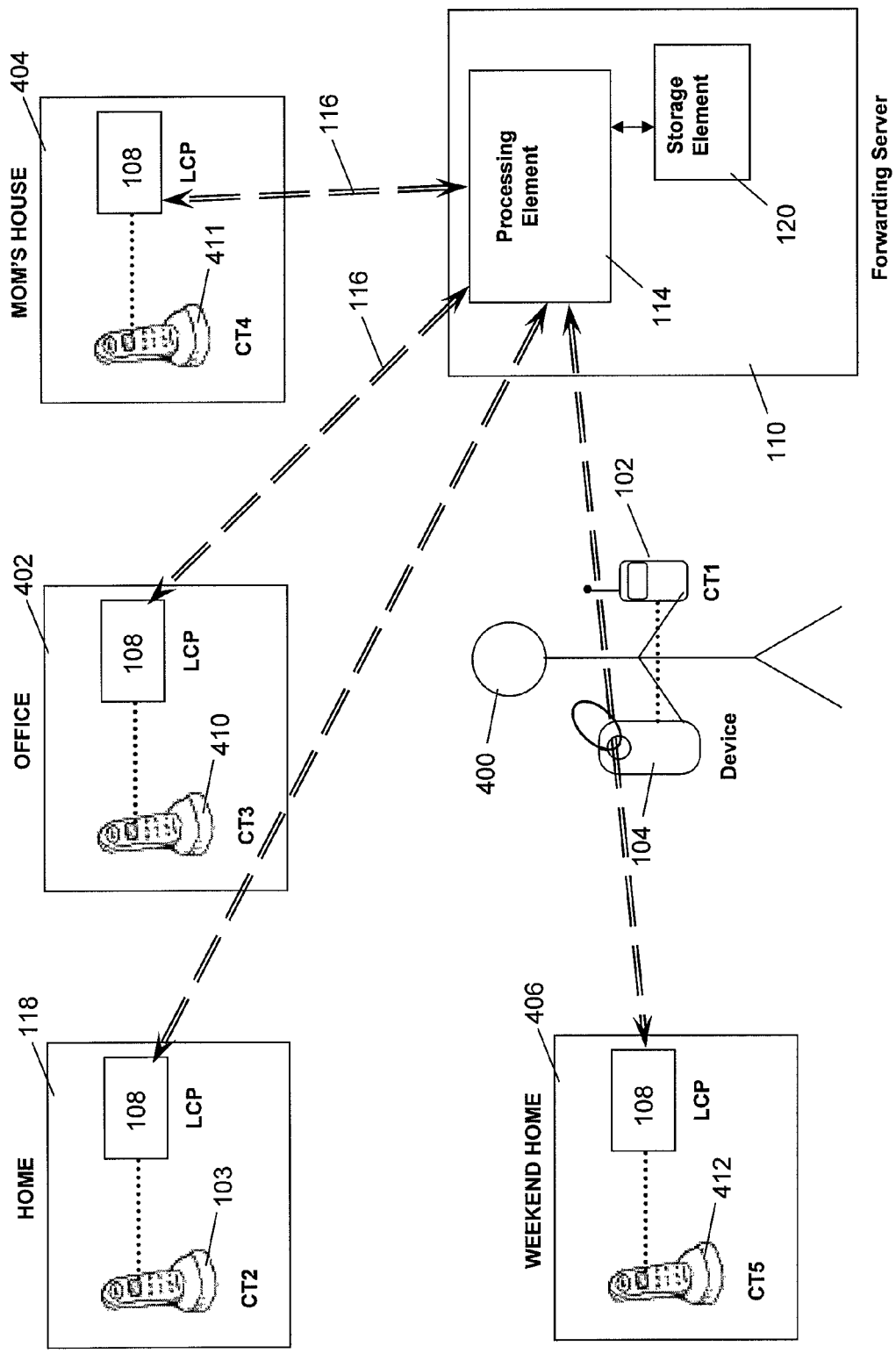
FIG. 4 is a schematic illustration of a system according to one embodiment showing five communications terminals.

For example, in FIG. 4 a situation is illustrated in which a user 400, carrying a presence notification device 104 that is associated with the first communications terminal (CT1) 102 (his mobile phone A), has four local connection points (LCP) 108 installed at various locations. He has an LCP 108 at home 118, which is associated with a second communications terminal (CT2) 103. He also has an LCP 108 at his office 402, one at his mother's house 404 (where he often spends his lunch and dinner times eating his mother's home-cooked meals), and one at his weekend home 406 in the mountains (where he generally finds a weak cellular signal). The LCP 108 at his office 402 is associated with a third communications terminal (CT3) 410 (his work phone), the LCP at his mother's house 404 is associated with a fourth communications terminal (CT4) 411 (his mother's wireline phone), and the LCP at his weekend home 406 is associated with a fifth communications terminal (CT5) 412 (a wireline phone). The user 400 may wish to receive all his calls at whichever location he happens to be at. Thus, when the user 400 is at his mother's house 404, he prefers any calls designated for CT1, CT2, CT3, or CT5 to be forwarded to CT4. However, when he is at home 118, at the office 402, or at his weekend home 406, he wants only calls designated for any of the communications terminals except CT4 forwarded to his location (i.e., he would prefer not to receive phone calls from his mother's friends). When he is at none of these locations, he similarly prefers all his calls forwarded to CT1, except for calls designated for CT4.

Figure 5:
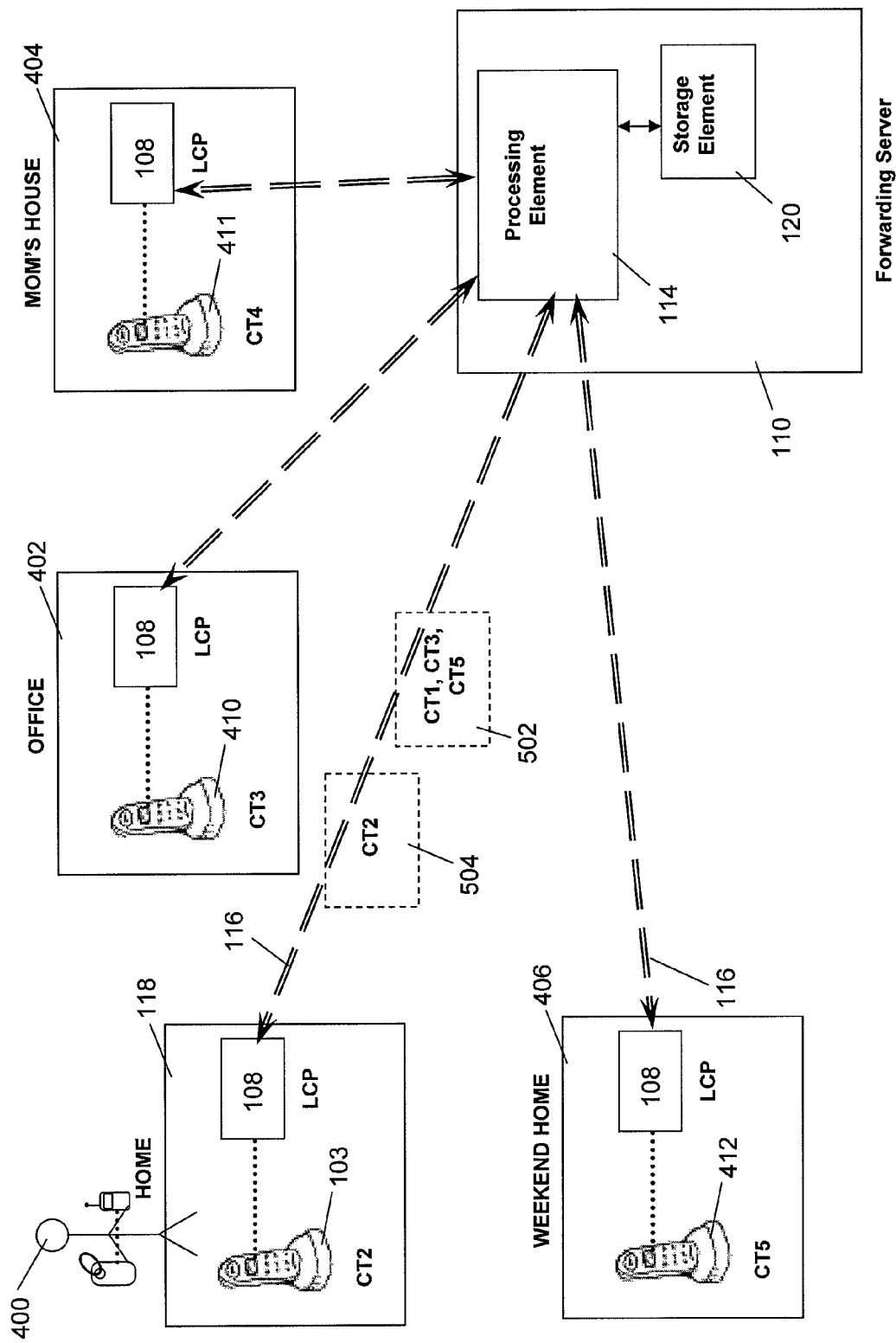
FIG. 5 is a schematic illustration of a system according to one embodiment showing forwarding instructions received from a local connection point.

In this example, the forwarding instructions may be received, at least partially, from one of the local connection points 108. For example, referring to FIG. 5, the data 116 received from one of the LCPs shown in FIG. 4 may include information identifying the communications terminals from which to forward calls 502 as well as the communications terminals to which the calls should be forwarded 504. As such, if the user 400 is at home, the processing element 114 may receive data 116 from the corresponding local connection point 108 that includes which calls to forward 502 (i.e., CT1, CT3, and CT5) and to which communications terminal to forward those calls 504 (i.e., CT2). Similarly, if the user is at the office (not shown), the processing element 114 may receive data 116 specifying that calls from CT1, CT2, and CT5 should be forwarded to CT3. Forwarding instructions from the local connection point 108, as described above, may be supplemented by additional forwarding instructions, such as instructions entered by a user through a GUI or secure webpage. Continuing the previous example, if none of the local connection points 108 provide an indication of presence P, a second condition of Not Present (NP) may be satisfied, in which case calls designated for CT2, CT3, and CT5 would be forwarded to CT1, as previously specified by the user.

Although not shown in the figures, the situation described in FIG. 4 may also apply in embodiments without a local connection point. In those cases, the network element 602 (shown in FIG. 6) may be configured to compare the position of the presence notification device 104 (derived from GPS data or signal strength data) to multiple locations. In other words, the network element 602 may determine if the device 104 is within 100 feet (for example) of the latitude and longitude position of the user's home, office, mother's house, or weekend home and may include this information in the data 116 transmitted to the forwarding server 110. As a result, the forwarding server 110 may forward the calls accordingly.

In other embodiments, a method for automatically forwarding calls based on presence is provided. Data is initially received from a local connection point or a network element including an indication of the presence of a presence notification device. As previously discussed, the presence notification device is associated with a first communications terminal, and the indication is based on a presence signal transmitted by the presence notification device and received by the local connection point or location information transmitted by the presence notification device and received by the network element. One or more forwarding instructions are then accessed, for example from a storage element such as a database, and each call is forwarded according to the forwarding instruction(s) and the indication. See FIG. 7, blocks 700-708.

For example, the data received from the local connection point or network element may include an indication that the presence notification device is present (such as when a user carrying the presence notification device has returned home). In this case, the forwarding instructions may provide for calls designated for the first communications terminal (CT1), which may be the user's mobile telephone, to be forwarded to a second communications terminal (CT2), which may be a wireline telephone or a VoIP client, for instance. See block 710, 712.

Alternatively, if the indication indicates that the presence notification device is not present (i.e., the local connection point does not receive the presence signal from the presence notification device or the device is not within a certain radius of a defined location), the forwarding instructions may provide for the forwarding of calls to be discontinued or deactivated. See blocks 710, 714, 716. For example, the user may wish to deactivate the call forwarding feature when he leaves his home and is out of range of the local connection point. In this case, calls designated for his wireline telephone at home, for example, will go to the wireline phone, and calls made to his mobile phone will go to the mobile phone. However, as discussed above, the user may prefer to have calls designated for his wireline phone forwarded to his mobile phone when he is away from home. In this case, the forwarding instructions may provide for the forwarding of each call designated for the second communications terminal to the first communications terminal according to the forwarding instruction(s) if the indication indicates that the presence notification device is not present at the local connection point or other predetermined location. See block 718.

As previously discussed, the data may be received over a wide area data network other than the network with which the first communications terminal is configured to directly communicate (e.g., other than a cellular network). For example, the data may be received over a public packet-switched network, such as the Internet, over a private IP network, or a over a combination of the two networks, among others.

Furthermore, a user input specifying at least one of the forwarding instructions may be received, such as through a GUI or over a secure web page. See block 720. For example, a user may specify the second communications terminal to which he wants calls forwarded by providing a telephone number, MAC address, or other identifier of the second communications terminal. Although block 720 is shown as occurring before other blocks in FIG. 7, the user may be able to provide inputs specifying or modifying the forwarding instructions at any point. The forwarding instructions may then be stored in a storage element, shown in block 722, such as a database or other memory structure as previously described and illustrated.

Figure 7:
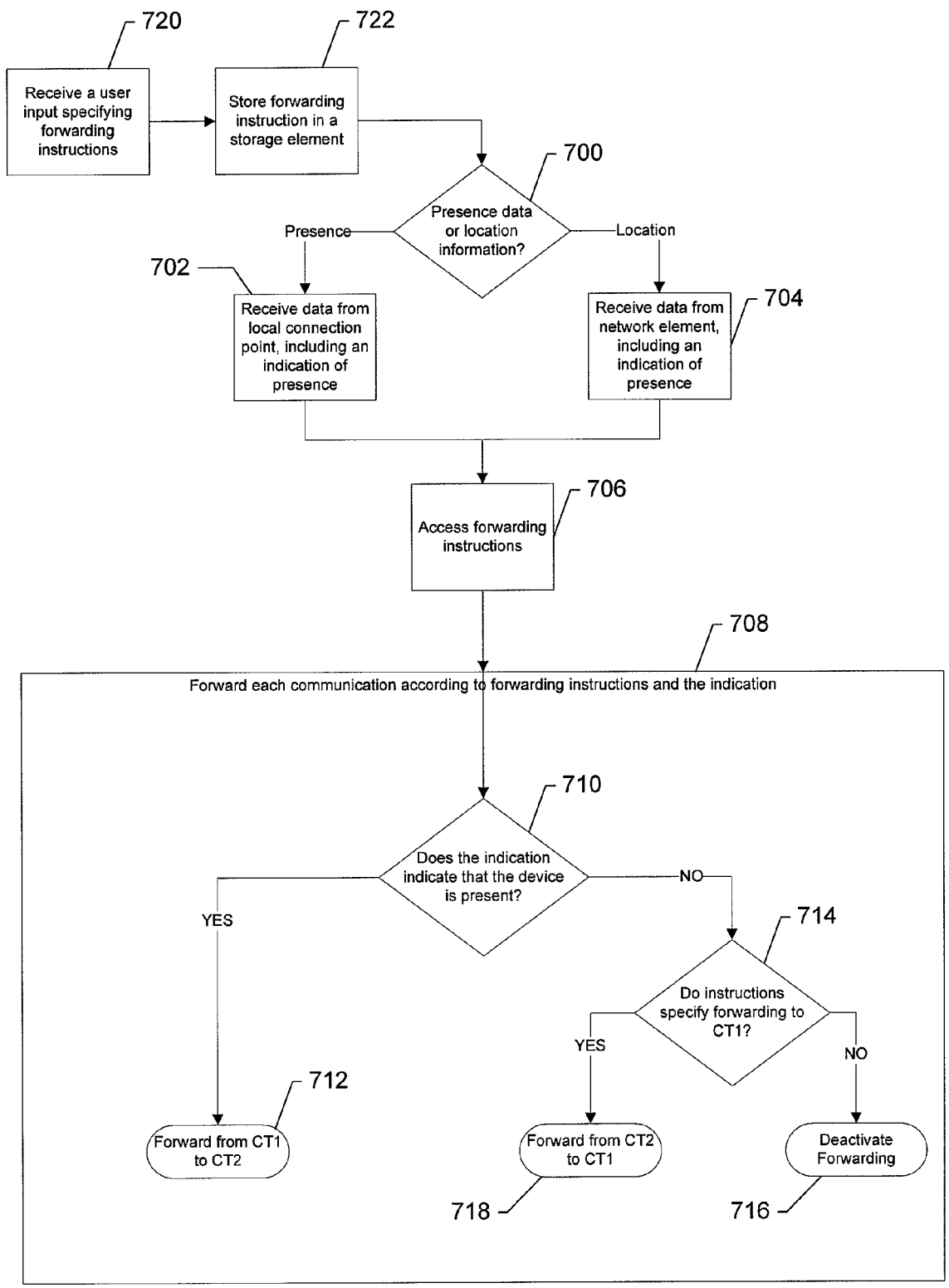
FIG. 7 is a flow chart illustrating embodiments of a method for automatically forwarding communications according to one embodiment.

It is understood that the operations described for the illustrated methods of FIG. 7 may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. Referring to FIGS. 1 and 6, for example, the executable portions may be stored in a storage element 120 of the forwarding server 110 or other memory otherwise accessible by the processing element 114 of the forwarding server 110 such that the processing element 114 may access and execute the executable portions of the computer program That which is claimed:

1. An apparatus comprising:
  a processing element to:
    determine that a mobile terminal, associated with a user, is not present at a first location, the processing element, when determining that the mobile terminal is not present at the first location being further to:
      receive, from a local connection point, associated with the first location, and through a wide-area network connecting the local connection point to the apparatus, an indication that the mobile terminal is not detected at the first location, the local connection point sending the indication based on not receiving, through a local wireless connection, a presence signal from a device associated with the mobile terminal,
      receive, from a network element that differs from the local connection point, location information associated with the mobile terminal, the network element deriving the location information from location signals associated with the mobile terminal, the location signals including at least one of Global Positioning System signals or terrestrial communication signals,
      process the location information to identify a particular location associated with the mobile terminal, and
      determine that the mobile terminal is not at the first location based on receiving the indication and when the particular location, associated with the mobile terminal, is more than a threshold distance from the first location,
    access, based on receiving the signal that the mobile terminal is not present at the first location, at least one forwarding instruction, and
    redirect, to the mobile terminal and according to the at least one forwarding instruction, a communication intended for a communications terminal associated with the user, the communications terminal being located at the first location.

2. The apparatus of claim 1, where the processing element is further to:
  determine one or more of the at least one forwarding instruction based on input received from one or more of a user interface or the local connection point.

3. The apparatus of claim 1, where the processing element is further to:
  receive an additional signal indicating that a mobile terminal is not detected at a second location that differs from the first location, and
  redirect, to the mobile terminal and according to the at least one forwarding instruction, another communication, where the other communication is intended for another communications terminal associated with the user, where the other communications terminal is located at the second location.

4. The apparatus of claim 3, where the processing element is further to:
  access the at least one forwarding instruction based on the additional signal indicating that the device is not present at the second location.

5. The apparatus of claim 1, where the wide-area network differs from a communication network associated with the mobile terminal.

6. A system comprising:
  a forwarding server to:
    receive, from a local connection point, associated with a first location, and through a wide-area network connecting the local connection point to the forwarding server, a signal, based on the local connection point not receiving the presence signal from a device associated with a mobile terminal, that the mobile terminal is not present at the first location,
    receive, from a network element that differs from the local connection point, location information associated with the mobile terminal, the network element deriving the location information from location signals associated with the mobile terminal, the location signals including at least one of Global Positioning System signals or terrestrial communication signals,
    process the location information to identify a particular location associated with the mobile terminal, and
    compare the particular location, associated with the mobile terminal, and the first location to determine that the mobile terminal is more than a threshold distance from the first location, and
    direct, to the mobile terminal and based on receiving the indication that the mobile terminal is not present at the first location and more than the threshold distance from the first location, a communication designated for a communications terminal associated with the first location.

7. The system of claim 6, where the forwarding server is further to:
  receive an additional signal that the mobile terminal is not present at a second location that differs from the first location, and
  direct, to the mobile terminal and based on receiving the indication that the mobile terminal is not present at the second location, another communication designated for another communications terminal associated with the user and the second location.

8. The system of claim 7, where the forwarding server is further to:
  direct, to the mobile terminal, the communication designated for the other communications terminal based on receiving the additional signal that the device is not present at the second location.

9. The system of claim 6, where the device comprises one of a passive short-range transceiver or an active short-range transceiver, and where the local connection point comprises a respective one of a passive short-range receiver or an active short-range receiver.

10. The system of claim 6, where the device is a component of the mobile terminal.

11. The system of claim 6, where the local connection point is movable from the first location.

12. A method comprising:
  receiving, by a server device, a signal indicating that a mobile terminal is not present at a first location, the signal being sent from a user device, associated with the first location, based on not receiving, at the first location, a presence signal from a device associated with the mobile terminal;

receiving, by the server device, location information derived, by a network element, from location signals associated with the device, the location signals including at least one of Global Positioning System signals or terrestrial signals;

processing, by the server device, the location information to identify a particular location associated with the device;

determining, by the server device, that the device is not present at the first location when the particular location is more than a threshold distance from the first location and based on receiving the signal;

accessing, by the server device and based on determining that the mobile terminal is not present at the first location, at least one forwarding instruction; and directing, by the server device and according to the at least one forwarding instruction, a communication to the mobile terminal, the communication being originally designated for a communications terminal, located at the first location, that differs from the user device and the mobile terminal.

13. The method of claim 12, where the server device receives the signal through a wide area data network that differs from a communications network associated with the mobile terminal.

14. The method of claim 12, where accessing the at least one forwarding instruction is further based on an additional signal indicating that the device is present at a second location that differs from the first location.

15. A non-transitory computer-readable storage medium to store instructions comprising:
one or more instructions which, when executed by a processor, cause the processor to receive, from a user device associated with a particular location, data comprising an indication that a signal, transmitted by a device coupled to a mobile terminal associated with a user, is not detected during a time period;
one or more instructions which, when executed by the processor, cause the processor to receive, from a network element that differs from the user device, location information derived from location signals associated with the device, the location information including one or more of Global Positioning System signals or terrestrial signals associated with the device;
one or more instructions which, when executed by the processor, cause the processor to process the location information to identify a location associated with the device;
one or more instructions which, when executed by the processor, cause the processor to determine that the device is not present at the first location based on the location, associated with the device, being more than a threshold distance from the first location and based on the receiving the indication;
one or more instructions which, when executed by the processor, cause the processor to access at least one forwarding instruction based on the received data; and
one or more instructions which, when executed by the processor, cause the processor to forward, according to the at least one forwarding instruction, a communication to the mobile terminal, the communication being originally designated for a communications terminal associated with the particular location, the communications terminal differing from the user device.

16. The non-transitory computer-readable storage medium according to claim 15, where the data is received over a wide area data network that differs from a communications network through which the communication would be forwarded to the mobile terminal.

17. The non-transitory computer-readable storage medium according to claim 15, further comprising:
one or more instructions to determine that the device is located at another location that differs from the particular location, and
where the one or more instructions to access the at least one forwarding instruction includes:
one or more instructions to access the at least one forwarding instruction further based on determining that the device is present at the other location.

18. The non-transitory computer-readable storage medium according to claim 15, where the device comprises one of a passive short-range transceiver or an active short-range transceiver, and where the user device comprises a respective one of a short-range receiver or an active short-range receiver.

19. The non-transitory computer-readable storage medium according to claim 15, where the device is a component of the mobile terminal.

20. The non-transitory computer-readable storage medium according to claim 15, where the user device is movable from the first location.

21. The non-transitory computer-readable storage medium according to claim 15, where the one or more instructions to access the at least one forwarding instruction further include:
one or more instructions to determine a time associated with the communication;
one or more instructions to obtain a first instruction, of a plurality of instructions, when the time associated with the communication is in a first time period; and
one or more instructions to obtain a second instruction, of a plurality of instructions, when the time associated with the communication is in a second time period that differs from the first time period.

* * * * *